(12) United States Patent
Reutlinger et al.

(10) Patent No.: US 6,908,130 B2
(45) Date of Patent: Jun. 21, 2005

(54) BUMPER FOR A MOTOR VEHICLE AND METHOD OF MAKING SAME

(75) Inventors: Peter Reutlinger, Bretten (DE); Eberhard Palmer, Vaihingen (DE); Andreas Piede, Illingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 10/687,937

(22) Filed: Oct. 20, 2003

(65) Prior Publication Data

US 2004/0135381 A1 Jul. 15, 2004

(30) Foreign Application Priority Data

Oct. 18, 2002 (DE) .......................................... 102 48 637

(51) Int. Cl.[7] .......................... B60R 19/18; B60R 19/34
(52) U.S. Cl. ...................... 293/155; 293/102; 293/120; 293/133
(58) Field of Search ................. 293/102, 120–122, 293/130–133, 155; 296/187.03, 187.09, 187.11, 203.01, 203.02, 203.04, 193.08, 193.09

(56) References Cited

U.S. PATENT DOCUMENTS

| 5,078,439 A | * | 1/1992 | Terada et al. ............. 293/122 |
| 5,114,522 A | * | 5/1992 | Takado et al. ............. 156/245 |
| 5,154,462 A | * | 10/1992 | Carpenter ................... 293/120 |
| 5,340,178 A | * | 8/1994 | Stewart et al. ............. 293/122 |
| 5,577,796 A | | 11/1996 | Clausen |
| 5,727,826 A | * | 3/1998 | Frank et al. ................ 293/102 |
| 6,141,935 A | | 11/2000 | Artner et al. |
| 6,325,431 B1 | * | 12/2001 | Ito ............................. 293/102 |
| 6,467,821 B2 | * | 10/2002 | Hirota ........................ 293/120 |
| 6,481,690 B2 | * | 11/2002 | Kariatsumari et al. ...... 293/155 |
| 6,502,874 B2 | * | 1/2003 | Kajiwara et al. ........... 293/133 |
| 6,712,410 B2 | * | 3/2004 | Kudelko et al. ............ 293/102 |
| 6,726,261 B2 | * | 4/2004 | Goto et al. ................. 293/120 |
| 6,746,061 B1 | * | 6/2004 | Evans ......................... 293/120 |
| 2003/0038488 A1 | | 2/2003 | Kudelko et al. |

FOREIGN PATENT DOCUMENTS

| CH | 689638 A5 | 7/1999 |
| DE | 93 13 297 | 12/1993 |
| DE | 199 04 879 | 8/2000 |
| DE | 100 19 871 | 7/2001 |
| EP | 1125798 A2 | 8/2001 |

OTHER PUBLICATIONS

European Search Report mailed Nov. 25, 2003.

* cited by examiner

Primary Examiner—D. Glenn Dayoan
Assistant Examiner—Greg Blankenship
(74) Attorney, Agent, or Firm—Crowell & Moring LLP

(57) ABSTRACT

In order to prevent a rear bumper from penetrating in the event of a crash so far into the vehicle body that a rear flap can no longer be operated, a so-called supporting element is arranged within the bumper in the area of the longitudinal center plane of the vehicle and/or at the ends, which supporting element constructs the bumper in a rigid manner in this area.

11 Claims, 3 Drawing Sheets

BUMPER FOR A MOTOR VEHICLE AND METHOD OF MAKING SAME

BACKGROUND AND SUMMARY OF THE INVENTION

This application claims the priority of 102 48 637.9 filed in Germany on Oct. 18, 2002, the disclosure of which is expressly incorporated by reference herein.

The invention relates to a bumper, particularly a rear bumper for a motor vehicle having a transversely extending bumper cross member which is supported on a vehicle body by means of end-side holding elements.

From German Patent Document DE 199 04 879 A1, a bumper for a vehicle is known which is connected with a vehicle body by means of deformable holding elements, and the bumper consists of a profile of the same cross-section with interior continuous reinforcing ribs. Furthermore, from U.S. Pat. No. 5,577,796, a bumper for a motor vehicle is known which has different cross-sectional surfaces and is provided with parallel extending foldable side walls.

An object of the invention is to provide an improved bumper for a motor vehicle which, on the one hand, has a rigid construction in regions but, on the other hand, is also deformable.

According to the invention, this object is achieved by providing a bumper, particularly a rear bumper, for a motor vehicle, having a transversely extending bumper cross member which is supported on a vehicle body by means of end-side holding elements, wherein the bumper cross member comprises a polygonal closed profile of the same cross-section which is supported at the end side by way of rigid holding elements on the vehicle body and has at least one rigid supporting element in a longitudinal center plane of the vehicle in the cross member, the areas of the cross member adjacent to the at least one rigid supporting element being constructed to be deformable or foldable.

Important advantages achieved by means of the invention are that the bumper has such a rigid construction in the center area and/or at the end side that, in the event of a rear crash, the rear flap of the vehicle cannot be damaged and can still be opened even after the crash. This is essentially achieved in that the bumper cross member consists of a polygonal closed profile of the same cross-section which is supported at the end side on the vehicle body by way of rigid holding elements. In a longitudinal center plane of the vehicle, at least one rigid supporting element is arranged in the cross member, in which case the areas of the cross member adjacent thereto are constructed to be deformable or foldable.

According to certain preferred embodiments of the invention, the profile of the cross member is composed of a rectangular first profile part facing the vehicle body and of an adjoining trapezoidal second profile part, the mutually opposite walls of the profile parts each having a curved recess of a measurement a. As a result, it is achieved that, in the event of an impact, the bumper has a rigid behavior in the center area but the cross member can fold or deform laterally of the supporting element to the holding elements.

So that an optimal rigidity of the cross member is achieved in the area in which the supporting element is arranged, this area comprises webs which are further developed in an X-shaped manner and which are supported by means of their free ends in each case in corner edges of the profile parts, and a vertex of the webs of the supporting element is situated approximately in a connection plane of the two partial profiles. As a result of this X-shaped supporting element, an introduction of force is achieved into the rigid corners of the profile, so that the supporting element cannot give way. In addition, the introduction of force also takes place by way of a narrow surface or by way of a slight spreading of the X-shaped webs in the trapezoidal profile part.

According to another embodiment of the invention, it is provided that the supporting element is arranged in the longitudinal center plane of the vehicle as well as at the end side of the bumper cross member and has deformable or foldable areas between these supporting elements of the cross members.

Other objects, advantages and novel features of the present invention will become apparent from the following detailed description of the invention when considered in conjunction with the accompanying drawings.

DETAILED DESCRIPTION OF THE DRAWINGS

Figure 1:
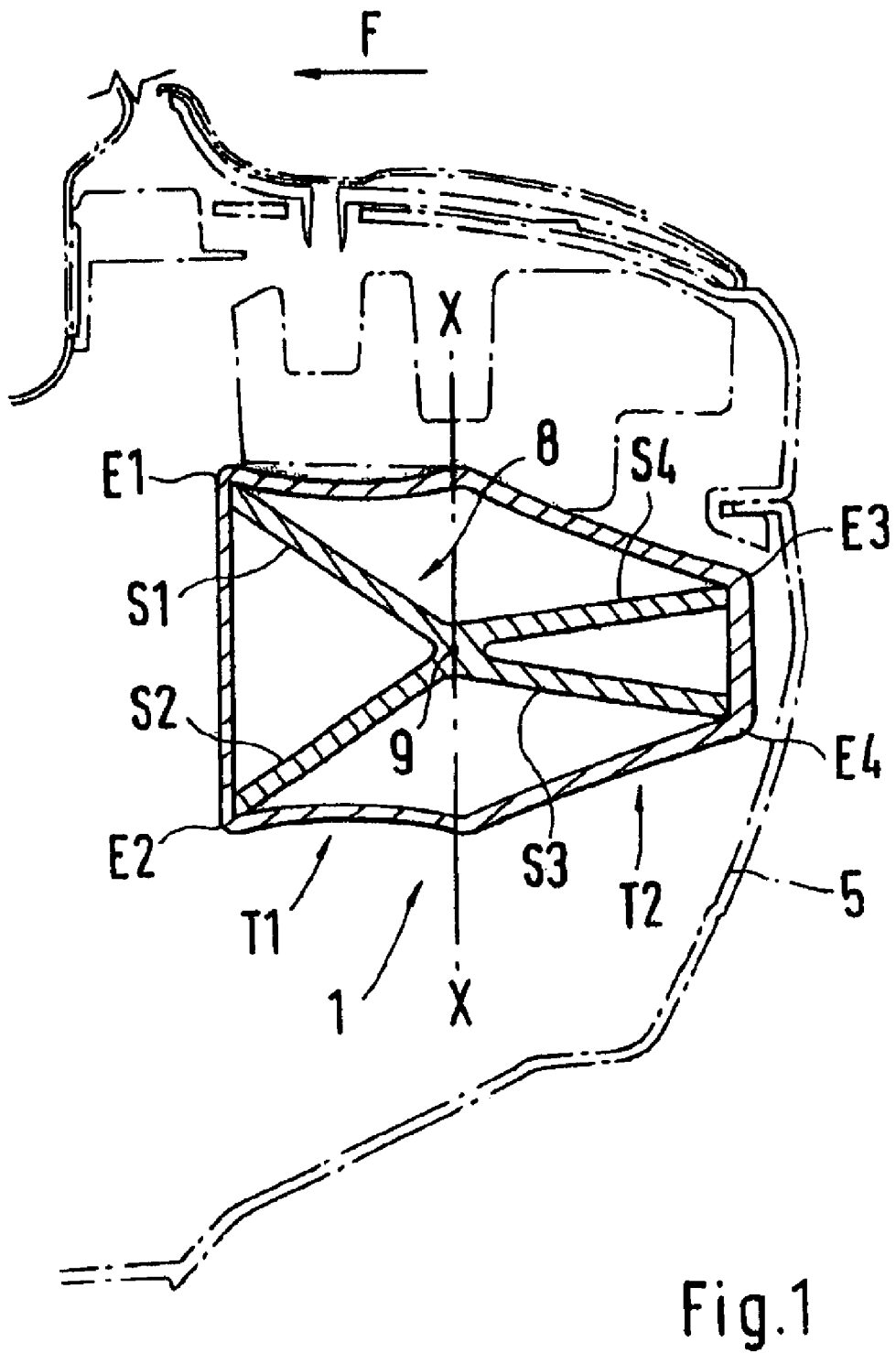
FIG. 1 is a cross-sectional view of a rear apron of a vehicle body with an interior bumper cross member constructed according to a preferred embodiment of the invention and showing a supporting element taken along Line I—I of FIG. 3.
Figure 2:
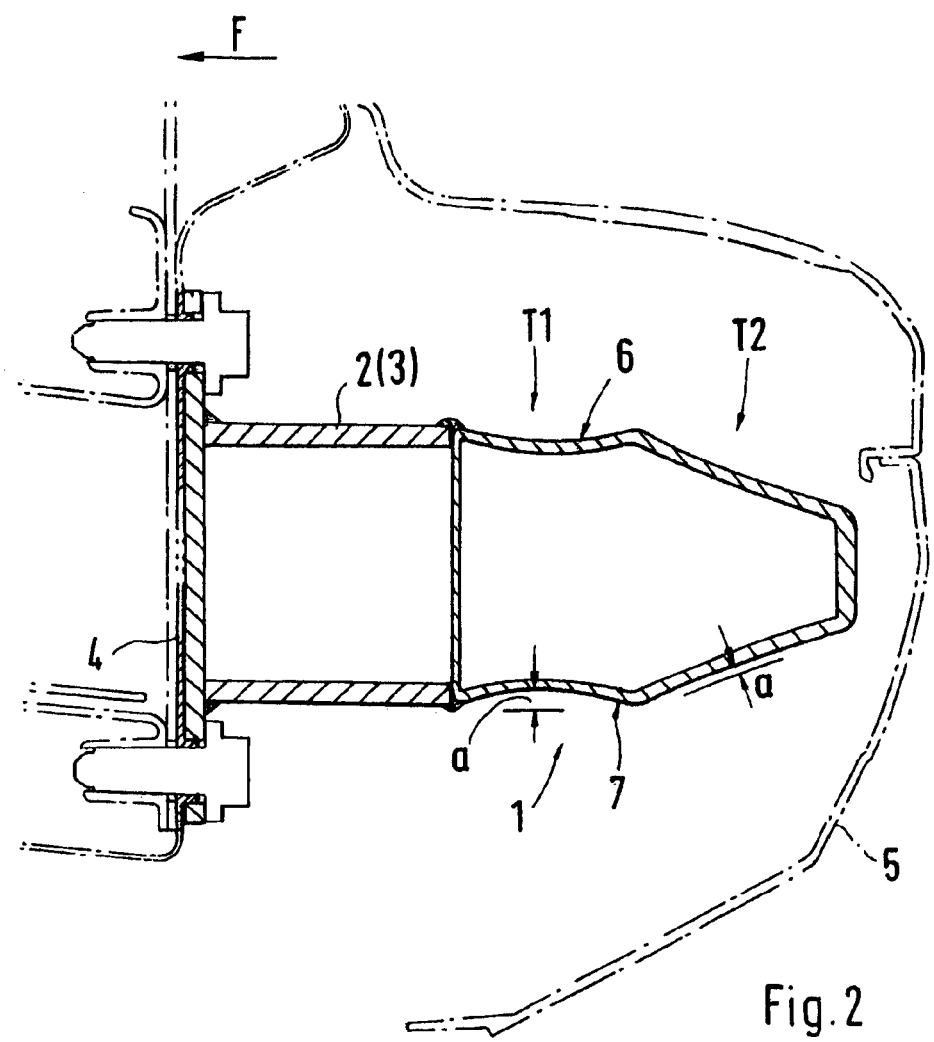
FIG. 2 is a cross-sectional view of the bumper cross member with holding elements taken along Line II—II of FIG. 3 arranged at the end side.
Figure 3:
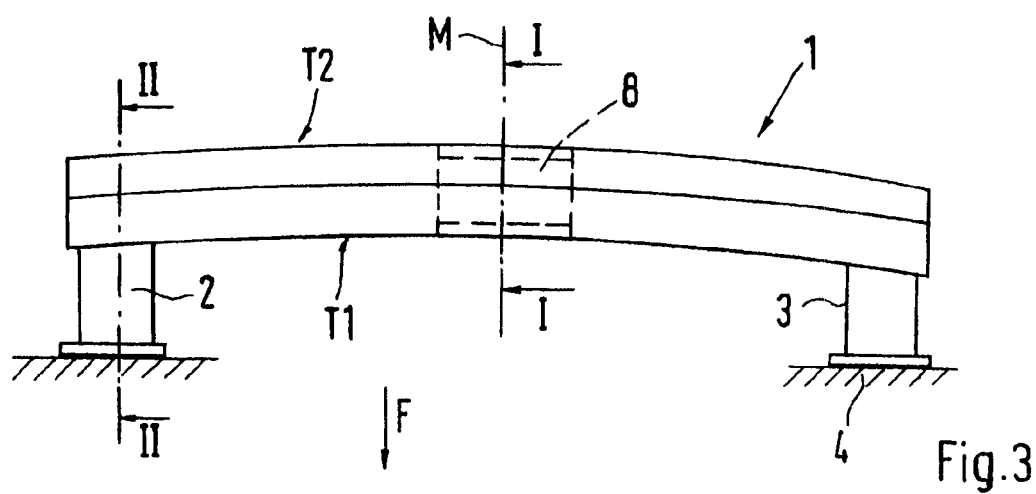
FIG. 3 is a top view of the bumper cross member with the rigid holding elements.

A bumper cross member 1 for a motor vehicle, which is arranged at the rearward end, extends transversely to the vehicle and is connected with the vehicle body 4 by means of rigid holding elements 2, 3.

The cross member 1 comprises essentially a hollow profile which has an identical polygonal cross-section along the entire length. In the cross-section, the profile comprises a first rectangular profile part T1 and an adjoining trapezoidal second profile part T2.

The rectangular profile part T1 directly faces the vehicle body 4, the trapezoidal profile part T2 extending against the driving direction F and facing a covering rear apron 5.

In its opposite walls 6 and 7, the profile T1, T2 of the cross member 1 has one curved recess respectively which has the measurement a so that, in the event of a crash, a deformation or a folding of the cross member 1 in these areas is not impaired.

Within the cross member 1, a supporting element 8, which comprises a profile with webs S1 to S4 further developed in an X-shape, is arranged in the area of the longitudinal center axis M of the vehicle. These webs S1 and S2 are supported in the corner edges E1 and E2 of the rectangular partial profile T1, and the additional webs S3 and S4 are supported in the corner edges E3 and E4 of the trapezoidal profile part T2. The individual webs S1 to S4 are connected with one another in a vertex 9 which is situated approximately in a connection plane X—X of the two profile parts T1 and T2.

Figure 4:
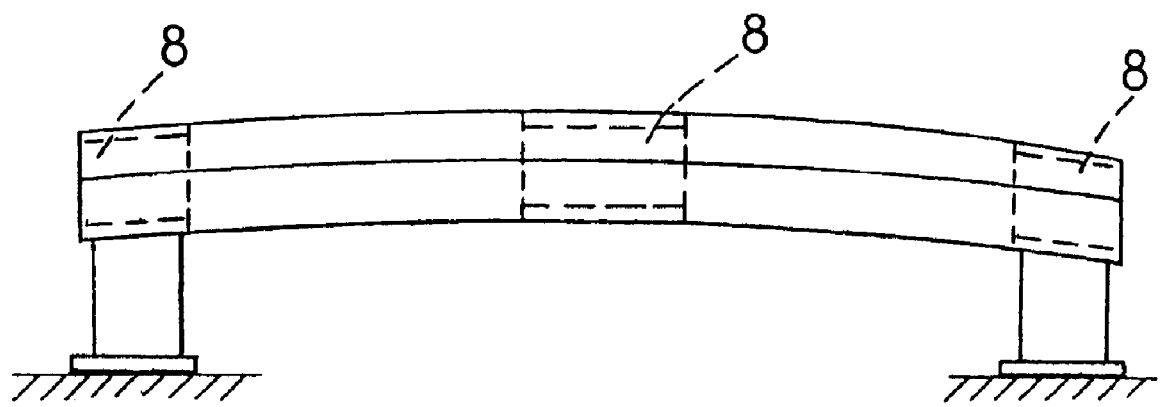
FIG. 4 is a view similar to FIG. 3 but showing additional supporting elements.

According to another embodiment of the invention, additional supporting elements 8 may also be arranged at the end side or sides of the bumper cross member 1 as shown in FIG. 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Bumper, particularly a rear bumper, for a motor vehicle, having a transversely extending bumper cross member which is supported on a vehicle body, wherein the bumper cross member comprises a polygonal closed profile of the same cross-section which is supported at end sides by way of rigid end-side holding elements on the vehicle body and has at least one rigid supporting element in a longitudinal center plane of the vehicle in the cross member, the areas of the cross member adjacent to the at least one rigid supporting element being constructed to be deformable or foldable.

2. Bumper according to claim 1, wherein the profile of the cross member is composed of a rectangular first profile part facing the vehicle body and an adjoining trapezoidal second profile part, and wherein each of mutually opposite walls of the first and second profile parts has a curved recess with a predetermined depth to facilitate deformation in the event of predetermined collision forces.

3. Bumper according to claim 1, wherein the supporting element comprises webs further developed in an X-shaped manner, which webs are supported by their free ends in each case in corner edges of the profile parts, and wherein a vertex of the webs of the supporting element is situated approximately in a connection plane of the profile parts.

4. Bumper according to claim 2, wherein the supporting element comprises webs further developed in an X-shaped manner, which webs are supported by their free ends in each case in corner edges of the profile parts, and wherein a vertex of the webs of the supporting element is situated approximately in a connection plane of the profile parts.

5. Bumper according to claim 1, wherein further supporting elements are arranged at end of sides of the bumper cross member, and wherein deformable or foldable areas are constructed in the bumper cross member at positions in between the supporting elements.

6. Bumper according to claim 2, wherein further supporting elements are arranged at end of sides of the bumper cross member, and wherein deformable or foldable areas are constructed in the bumper cross member at positions in between the supporting elements.

7. Bumper according to claim 3, wherein further supporting elements are arranged at end of sides of the bumper cross member, and wherein deformable or foldable areas are constructed in the bumper cross member at positions in between the supporting elements.

8. Bumper according to claim 1, wherein the supporting element consists of an extruded profile.

9. Bumper according to claim 3, wherein the supporting element consists of an extruded profile.

10. A method of making the bumper of claim 1, comprising forming the at least one rigid supporting element by extruding same.

11. A method of making the bumper of claim 3, comprising forming the at least one rigid supporting element by extruding same.

* * * * *